United States Patent
Swanborn

(10) Patent No.: US 6,176,900 B1
(45) Date of Patent: Jan. 23, 2001

(54) METHOD AND DEVICE FOR TREATING OF A GAS/LIQUID ADMIXTURE

(76) Inventor: Rombout Adriaan Swanborn, Kemperbergerweg 39, NL-6816 RN, Arnhem (NL)

( * ) Notice: Under 35 U.S.C. 154(b), the term of this patent shall be extended for 0 days.

(21) Appl. No.: 09/202,974

(22) PCT Filed: Jun. 24, 1997

(86) PCT No.: PCT/NL97/00350
§ 371 Date: Jul. 22, 1999
§ 102(e) Date: Jul. 22, 1999

(87) PCT Pub. No.: WO97/49477
PCT Pub. Date: Dec. 31, 1997

(30) Foreign Application Priority Data

Jun. 24, 1996 (NL) .................................................. 1003408

(51) Int. Cl.$^7$ .................................................. B01D 45/12
(52) U.S. Cl. .................. 95/269; 55/340; 55/348; 55/424; 55/457
(58) Field of Search .............................. 55/346, 347, 348, 55/339, 340, 424, 456, 457; 95/269

(56) References Cited

U.S. PATENT DOCUMENTS 3,199,270 * 8/1965 Oehlrich .................................. 55/457
3,964,884 * 6/1976 Judith et al. ........................... 55/340
4,197,102   4/1980 Decker ................................... 55/449

FOREIGN PATENT DOCUMENTS 0436973   7/1991 (EP) .
8101961   7/1981 (WO) .
9305339   3/1993 (WO) .

* cited by examiner

Primary Examiner—David A. Simmons
Assistant Examiner—Robert A. Hopkins
(74) Attorney, Agent, or Firm—Webb Ziesenheim Logsdon Orkin & Hanson, P.C.

(57) ABSTRACT

Method and device for treating a gas/liquid mixture, the device comprising: an inlet for infeed of the mixture; a flow element placed in the line of the inlet and having one or more swirling members to cause turbulence of the mixture; an outlet placed in the line of the flow element for outfeed of the gas flow having liquid at least partially removed; one or more feedback lines for discharge of the separated liquid and a part of the gas flow, wherein the feedback lines are connected onto a channel arranged centrally in the flow element; and anti-creep flow means for preventing creep flow along the flow element.

10 Claims, 1 Drawing Sheet

METHOD AND DEVICE FOR TREATING OF A GAS/LIQUID ADMIXTURE

BACKGROUND OF THE INVENTION

1. Field of the Invention

The present invention is directed to a compact gas/liquid separator having a creep flow interrupter.

2. Description of the Related Art

Gas/liquid separators generally take a bulky form in order to make certain that the separation efficiency required in determined conditions is ensured. In practice however, problems occur in difficult conditions, such as high operating pressures, high viscosity of the liquid or in conditions where the space is limited, such as occur for instance in offshore oil fields. Poor gas/liquid separators can considerably impair the production yields of oil fields.

SUMMARY OF THE INVENTION

The present invention provides a device for treating a gas/liquid mixture, comprising:

an inlet for infeed of the mixture;

a flow element placed in the line of the inlet and having one or more swirling members to cause turbulence of the mixture;

an outlet placed in the line of the flow element for outfeed of the gas flow having liquid at least partially removed;

one or more feedback lines for discharge of the separated liquid and a part of the gas flow, wherein the discharge line is connected onto a channel arranged substantially centrally in the flow element and wherein close to the end of the channel an anti-creep flow element is arranged for preventing creep flow of liquid.

In contrast to existing separating devices wherein a mixture flows through a set of parallel plates or through a layer of net-like wires or wherein use is made of a traditional cyclone wherein liquid is introduced therein radially, the present device has extremely compact dimensions, achieves a high separation efficiency which does not depend (or depends little) on liquid viscosity, has an extremely low pressure drop and/or a wide-ranging-option of decreasing the flow rate (turn down ratio).

The anti-creep flow means are preferably formed by an anti-creep flow element close to the end of the channel. It is however also conceivable to arrange such anti-creep flow means at another location in the device according to the present invention or to have them formed by a determined dimensioning of the flow element and/or the swirling members and/or by preselected values of the flow speed of the mixture and/or the pressure ratios in the device according to the present invention.

The present invention further provides a method for treating a gas/liquid mixture, wherein a device according to any of the foregoing claims is applied. The present invention likewise relates to a system for treating a gas/liquid mixture from a bored well in the earth's crust, comprising:

an outer pipeline which is lowered into the bored well;

an inner pipeline which is arranged in the outer pipeline while leaving clear and suitably arranged to form a radial space; and a plurality of parallel placed gas/liquid separating devices which are arranged in the radial space and which each comprise an inlet for infeed of the mixture, a flow element placed in the line of the inlet and having one or more swirling members to cause turbulence of the mixture, the outlet placed in the line of the flow element for outfeed of the gas flow having liquid at least partially removed and one or more feedback lines for discharge of the separated liquid and a part of the gas flow.

Partly due to the extremely compact dimensions, devices according to the present invention can herein be disposed in considerable numbers in a circular arc between the casing and the tubing in a borehole, whereby so-called decks are formed, while a plurality of such decks can likewise be placed in series for separation of for instance 99.5% of the liquid and the gas.

In the sub-claims further steps are designated for an extremely compact embodiment of the device according to the present invention, in addition to the method wherein use is made of one or more such devices.

Further advantages, features and details of the present invention will be elucidated in the light of the following description with reference to the annexed drawing, in which:

DETAILED DESCRIPTION OF THE PREFERRED EMBODIMENTS

Figures 1, 2:
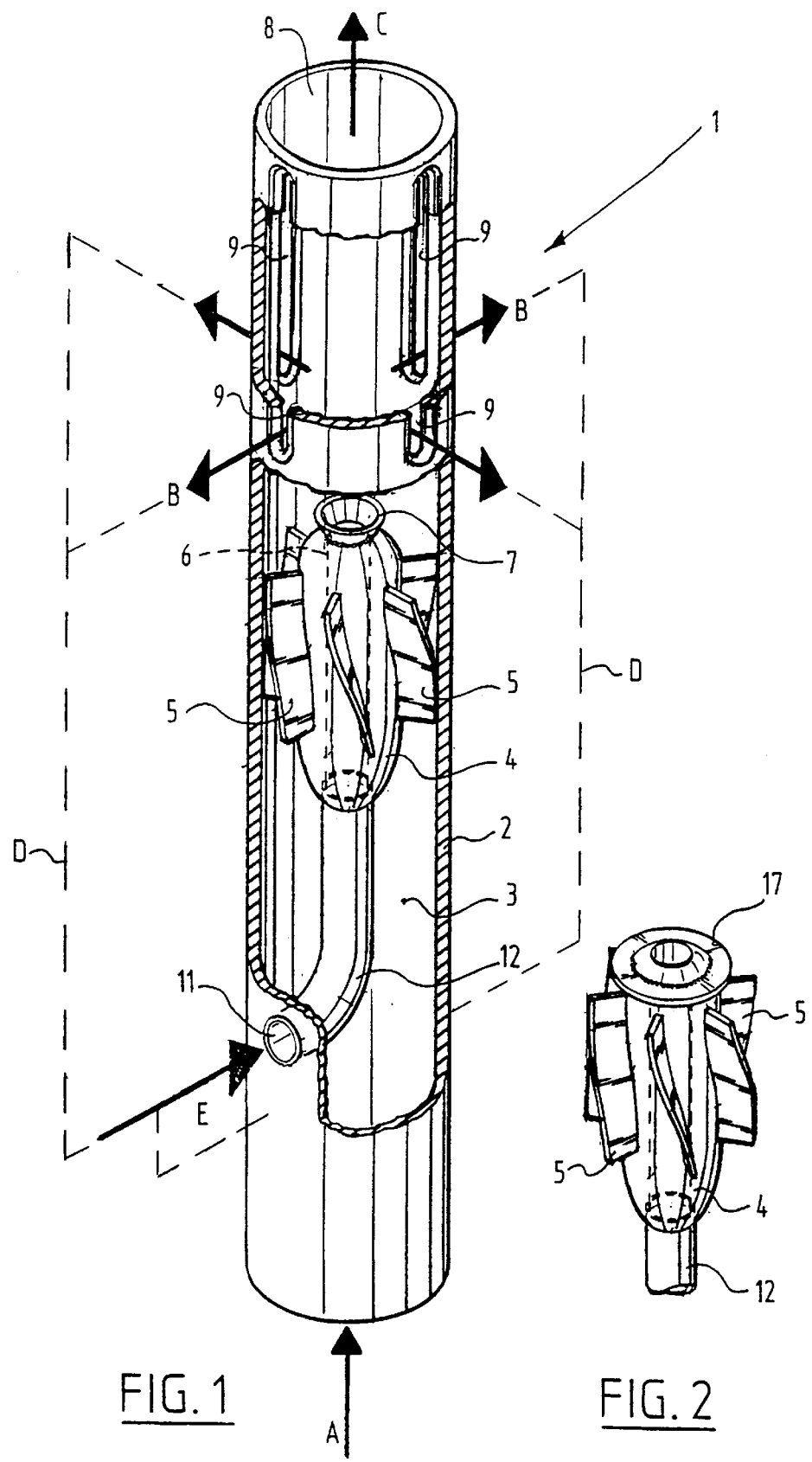
FIG. 1 shows a partly broken away view in perspective of a first preferred embodiment of a device according to the present invention.
FIG. 2 shows a view in perspective of a modified component for the device of FIG. 1.

A device 1 (FIG. 1) comprises a substantially cylindrical wall 2 having an upstream end and a downstream end which bounds a flow space 3. Placed in flow space 3 is a flow body 4 which is provided on its outer periphery with curved swirling blades 5 and in the interior of which is arranged a channel 6. A creep interrupter 7 is arranged on the top (downstream) end of channel 6. Under an outlet opening 8 the device 1 is provided with elongate slots openings 9.

During operation of the device or cyclone 1 according to the present invention a mist of gas and liquid (droplets) is supplied through an inlet in the direction of arrow A into the flow space 3, whereafter this liquid flow acquires a cyclone-like flow pattern due to swirling blades 5. Due to the centrifugal force the liquid particles are moved at least to a considerable extent radially out of the gas flow via the longitudinal slots 9 in the direction of arrows B, together with for instance 20% of the quantity of gas, while the remaining gas flow with at least a large part of the liquid removed leaves the device in the direction of arrow C via outlet opening 8. Gas flows B are fed back, as indicated with broken lines D, to a secondary inlet 11 which fluidly connects onto a channel 12 to the internal channel 6 in the flow body 4.

This secondary gas flow in the direction of arrows B and E serves to increase the efficiency of discharge of solid particles such as dust particles, and thus also contributes toward cleaning of the gas flow. Owing to the cyclone action of the swirling blades a relatively low pressure is present at the outlet of internal channel 6, whereby the secondary, fed back gas flow is drawn in by the main flow.

It has been found in practice that close to the transition of the outlet channel of flow body 4 and space 3 creep flow of liquid can take place along the surface thereof due to the relatively low pressure there, which would mean that this liquid would be carried along by the fed back gas flow and would enter the outfeed flow C. In order to prevent this undesired effect a creep flow interrupter 7 is arranged in the device according to the present invention which deflects the liquid flow outward along the flow element 4 so that the liquid can be carried along by the turbulence current on the outer side of the flow body.

In the shown preferred embodiment of FIG. 1 the creep interrupter takes the form of a hollow truncated cone, while in the embodiment of FIG. 2 a creep interrupter element 17 takes the form of a substantially flat dish.

The extremely compact device according to the present invention causes only a very small pressure drop in the flow of the mixture of for instance 30 mBar, brings about a high separating efficiency and is not susceptible to great changes in operating conditions. Manufacturing costs for a device according to the present invention can be extremely low.

The present invention is not limited to the above described preferred embodiments thereof; the rights applied for are defined by the following claims.

What is claimed is:

1. A device for treating a gas/liquid mixture, comprising:
   a. a substantially cylindrical wall defining a flow space having an upstream end and a downstream end and having one or more openings adjacent to the downstream end;
   b. an inlet for infeed of the mixture at the upstream end of said wall;
   c. a flow element placed downstream relative to said inlet and upstream relative to the openings in said wall, having a channel arranged centrally therein, said flow element having one or more swirling members to cause turbulence of the mixture;
   d. an outlet in said wall downstream of said flow element for outfeed of the gas flow having liquid at least partially removed;
   e. one or more feedback lines fluidly connected to the openings in said wall for discharge of liquid and part of the gas flow separated from the gas/liquid mixture through the openings, wherein said feedback lines are fluidly connected to an upstream end of said channel; and
   f. an anti-creep flow element extending from a downstream end of the flow element and arranged about the channel.

2. The device as claimed in claim 1, wherein the anti-creep flow element extends downstream from said flow element.

3. The device as claimed in claim 1, wherein the anti-creep flow element extends radially at least some distance outwards relative to the channel and toward said wall.

4. The device as claimed in claim 1, wherein the anti-creep flow element has a truncated cone shape.

5. The device as claimed in claim 1, wherein the anti-creep flow element is at least partly disc-shaped.

6. The device as claimed in claim 1, wherein the swirling members comprise swirling blades curved in flow direction.

7. The device as claimed in claim 1, wherein about 2–20% of the gas flow is fed back.

8. The device as claimed in claim 1, wherein the internal diameter of the channel is at least 2 mm.

9. A method for treating a gas/liquid mixture, comprising the steps of:
   a. providing a device as claimed in claim 1, and
   b. feeding a mixture of gas and liquid through the inlet of the device.

10. A system for treating a gas/liquid mixture from a bored well in the earth's crust, comprising:
    a. an outer pipeline which can be lowered into a bored well;
    b. an inner pipeline within the outer pipeline suitably arranged to form a radial space; and
    c. a plurality of gas/liquid separating devices as claimed in claim 1, arranged in parallel within the radial space.

* * * * *